United States Patent [19]

Sharp

[11] 4,156,951
[45] Jun. 5, 1979

[54] WINDSHIELD WIPER BLADE UNIT AND FASTENING CLIP

[75] Inventor: Bernard C. Sharp, White Plains, N.Y.

[73] Assignee: Parker-Hannifin Corporation, Shelton, Conn.

[21] Appl. No.: 807,834

[22] Filed: Jun. 20, 1977

[51] Int. Cl.² .............................................. B60S 1/38
[52] U.S. Cl. ................................................ 15/250.42
[58] Field of Search ..................................... 15/250.42

[56] References Cited

U.S. PATENT DOCUMENTS

| 3,153,254 | 10/1964 | Lenz et al. ......................... 15/250.42 |
| 3,626,544 | 12/1971 | Lopez et al. ....................... 15/250.42 |
| 3,769,653 | 11/1973 | Lopez ................................. 15/250.42 |
| 3,919,736 | 11/1975 | Bourassa et al. .................. 15/250.42 |

FOREIGN PATENT DOCUMENTS 2504985  8/1975  Fed. Rep. of Germany ........ 15/250.42
2506128  8/1975  Fed. Rep. of Germany ........ 15/250.42

*Primary Examiner*—Christopher K. Moore
*Attorney, Agent, or Firm*—Albert C. Johnston

[57] ABSTRACT

A windshield wiper blade unit including an elongate backing strip having a slotted central hollow to receive slidably the head and neck portions of an elastic wiper blade, and having along its sides laterally open channels to receive blade holder claws, is held detachably in place on such claws by a resilient clip formed with a base portion lying across an end of the backing strip, a footing portion extending forwardly from the base portion and fixed to a central portion of the strip, and elastically convergable resilient wing portions extending forwardly from ends of the base portion and each having a substantially flat leg extending therefrom inwardly and then forwardly, over and in face-to-face relation to an upper side flange of the strip, to a claw latching portion protruding outwardly from the leg.

5 Claims, 5 Drawing Figures

U.S. Patent  Jun. 5, 1979  4,156,951
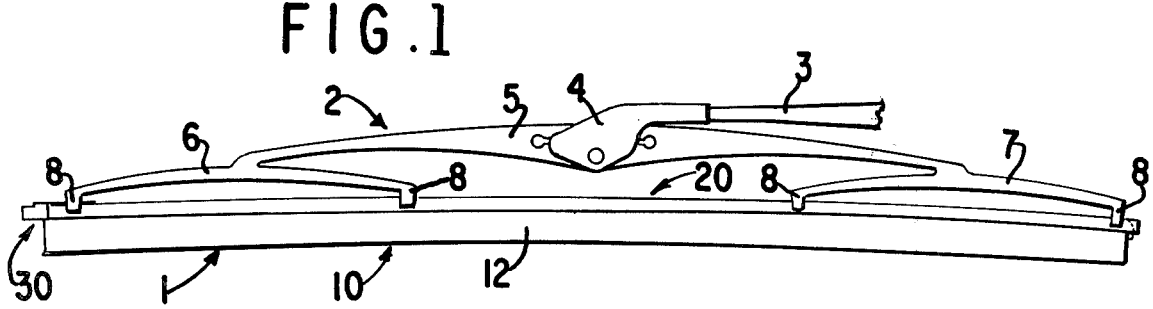
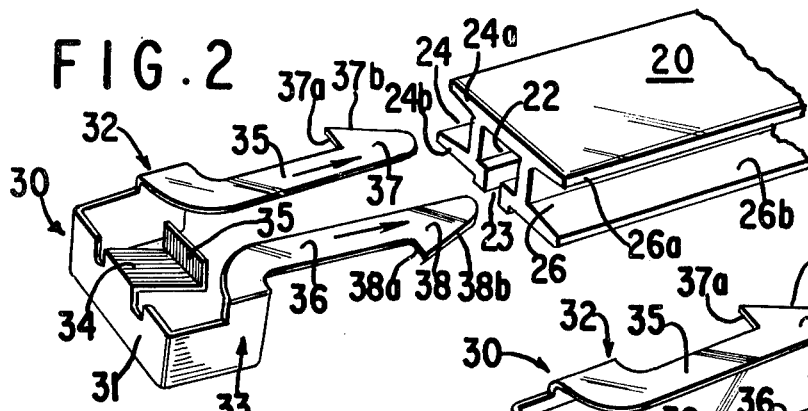
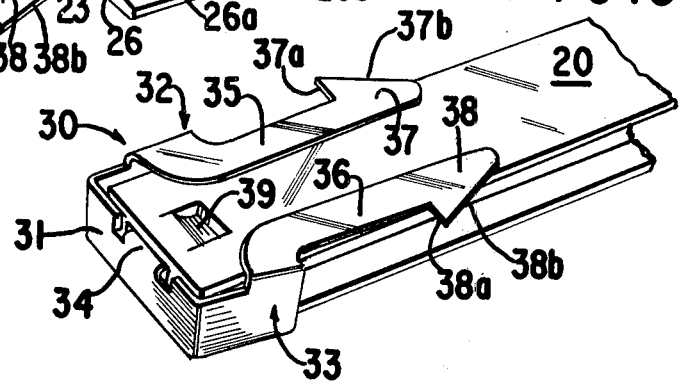
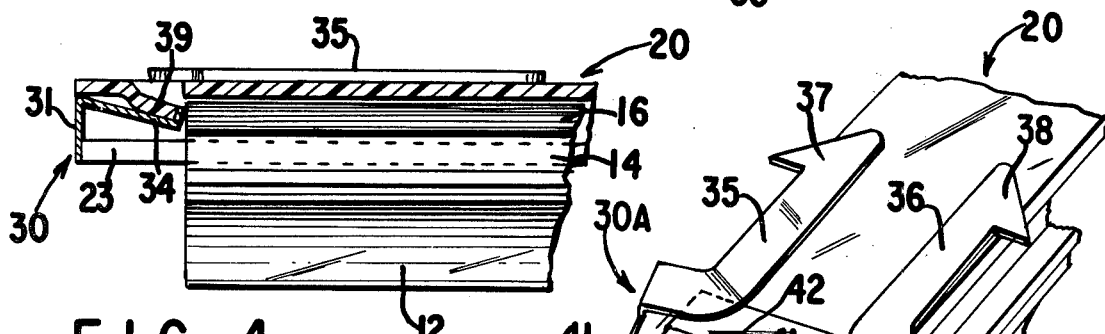
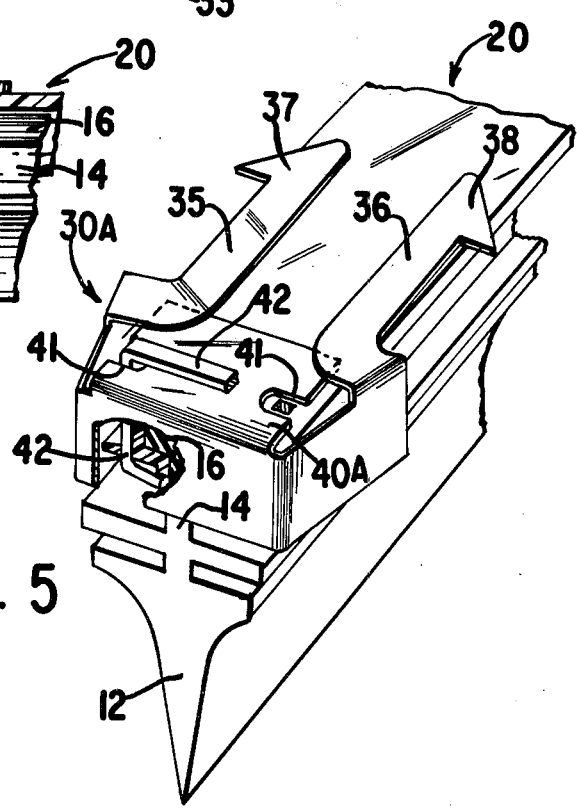

WINDSHIELD WIPER BLADE UNIT AND FASTENING CLIP

This invention relates to windshield wipers and, more particularly, to a wiper blade unit, or blade refill, provided with an improved resilient clip for fastening the blade unit detachably on the claws of a pressure-applying wiper blade holder.

Windshield wipers for curved automobile windshields generally comprise a replaceable blade unit held slidably in a pressure-applying blade holder, often called a super-structure, which comprises bowed yoke portions having claws at their ends. The blade unit includes an elastic wiping blade, usually made of rubber, supported by a backing strip or pair of strips that is flexible in the direction perpendicular to the windshield surface under pressure applied through the blade holder from a wiper arm. Lateral portions of the backing strip are engaged by the claws of the blade holder, and a structure of fastening device on the strip engages with a portion of the holder to keep the blade unit from sliding out of the claws in use.

In recent years wiper blade refills have been provided which serve for replacement of the blade units of various forms of windshield wipers. Such refills are disclosed, for example, in U.S. Pat. Nos. 3,626,544, 3,707,741 3,769,653, 3,885,265, 3,919,736 and 3,940,823. Also, refills have been provided, for example as described in U.S. Pat. Nos. 3,408,680 and 3,919,736, which make use of blade backing members formed integrally as a strip of extruded resilient plastic material.

Several of the enumerated patents, and others including U.S. Pat. Nos. 2,983,945 and 3,153,254, disclose resilient fastening clips formed to be mounted on an end of the backing of a wiper blade unit and to engage detachably with an end set of the claws of a blade holder for keeping the blade unit in place on the claws. Such a fastening clip especially suited for a longitudinally hollow, laterally channelled backing strip of extruded plastic material is disclosed in U.S. Pat. No. 3,919,736.

The fastening clip last mentioned, though beneficial for its purposes, involves several practical shortcomings. One is that the lower channel-forming walls or flanges of the backing strip must be notched to enable mounting the clip on the backing strip. Another is that the clip is sometimes difficult to insert into the end of the backing strip, and the parts do not lend themselves to assembly by a hopper-fed machine. Still others involve limits of serviceability of the clip and the fact that the distance of its extension into the backing strip reduces the length of the rubber wiping element held in the strip.

The principal object of the present invention is to provide a wiper blade unit, or blade refill, and an improved fastening clip therefor, by which such shortcomings can be materially reduced or overcome.

The wiper blade unit herein set forth is similar to some of the known refills in that it makes use of a transversely flexible backing strip that can be constituted by an extruded length of a suitably resilient plastic material, being formed with a longitudinal hollow, or cavity having a slot along its bottom for slidably receiving head and neck portions of an elastic wiper blade and with laterally open channels along the opposite sides of the strip for slidably receiving the claws of a pressure-applying blade holder, and a resilient fastening clip is secured to one end of the strip for holding the unit assembled detachably on the blade holder claws.

In the present blade unit, unlike the known refills, an extrusion or molding employed for the backing strip can be kept symmetrically uniform from end to end thereof, so that the hollow, the slot and the side channels of the strip extend completely to each of its ends; and the resilient fastening clip is provided in a form enabling it to be affixed relatively easily to one end of the strip and also to enhance the serviceability of the assembled blade unit.

The fastening clip according to the invention is formed integrally as a unitary shaped piece of a stiff resilient material that will not corrode in use, which preferably is a sheet metal, such as sheeted stainless steel, about 0.013 to 0.016 inch thick. The piece is shaped so that it forms a base portion to lie across one end of the blade backing strip, with a footing portion extending forwardly from the base portion so as to mate and be fixed to a central portion of the backing strip, and with resilient wing portions extending forwardly from the opposite ends of the base portion to overlie but normally slope away from end portions of the claw-receiving channels of the backing strip. At least one of these wing portions, and preferably each of them, is provided with a substantially flat leg formed to extend inwardly and then forwardly over one of the upper side flanges of the backing strip in face-to-face relation thereto, and each such leg has an outwardly protruding latch portion thereon near its end for engagement with one of the claws at an end of a wiper blade holder fitted with the blade unit. The sloped wing portions are convergeable elastically by the pressure of a person's fingers so that the leg or legs can then be displaced inwardly over the upper side of the backing strip to a position in which latch portion is disengaged from the blade holder claws, thereby rendering the blade unit easily disengageable for removal and replacement by another blade unit.

According to another feature of the invention, the footing portion of the fastening clip is formed to extend from the base portion of the clip into the hollow of the backing strip of the blade unit, and is formed at or near its end with an angled lip thereon which is disposed inside the hollow when the clip is assembled onto the backing strip. The footing portion then is fixed in place by a portion of the backing strip material, which is struck from the strip wall so as to extend into the hollow in butting engagement with the lip therein. For instance, a tab of the strip material is simply struck down from the top side of the backing strip near its end so as to butt against an upturned lip at the end of the footing portion of the clip.

A number of advantages over previously known structures are obtained by virtue of the present fastening clip and its relationships to the backing strip and the elastic wiping element of the blade unit. A backing strip simply cut from an extrusion of the resilient strip material can be used without need to form notches or openings in it to receive the clip. The clip can be assembled easily onto the strip and fixed in place by operations which do not stress the strip excessively, and which lend themselves readily to performance by hopper-fed automatic machinery. The clip in place on the blade unit is disposed beside and over the backing strip in a way rendering it unlikely to damage a windshield if the elastic wiping element should fail so as to let the end of the backing strip ride on the windshield surface. Further, the clip will fasten the blade unit more reliably to various common forms of wiper blade holders, or "superstructures"; it can be released from blade holder claws and re-engaged with them many times without becoming deformed; and it occupies a shorter end portion of the backing strip than do previous clips, thus enabling the elastic wiping element, or rubber blade proper, to be somewhat longer, so to wiper better, by extending nearer to the end of the backing strip.

The above mentioned and other objects, features and advantages of the invention will be further evident from the accompanying drawings and the following detailed description of illustrative embodiments of the invention. In the drawings:

FIG. 1 is a side elevational view of the blade unit assembled for use in the claws of a wiper blade holder;

FIG. 2 is an enlarged exploded perspective view of a preferred form of the fastening clip of the backing strip;

FIG. 3 is a perspective view of an end portion of the blade unit with the clip fixed in place thereon;

FIG. 4 is a sectional view taken at line 4—4 of FIG. 3; and

FIG. 5 is a perspective view of another form of the fastening clip fixed to an end portion of the backing strip.

The windshield wiper assembly shown in FIG. 1 comprises a replaceable blade unit 1 according to the present invention, fitted onto a pressure-applying blade holder 2 which may be of any various commercial types but as shown is of the type disclosed in U.S. Pat. No. 3,928,887.

The blade holder is connected on the end of a windshield wiper arm 3 through a coupler 4 pivoted to a central portion of its primary yoke, or bow member, 5. The ends of the primary yoke are connected pivotably with midportions of secondary yokes, or bow members, 6 and 7. The secondary yokes carry claws 8 at their ends for sliding engagement with the backing strip of the blade unit.

The blade unit 1 consists essentially of an elastic rubber blade 10, a transversely flexible backing strip 20, and a fastening clip 30 fixed to one end of strip 20. The strip and clip normally are united inseparably when completely assembled, with the blade 10 securely supported yet held pivotably and slidably in the strip 20 between its ends.

The blade 10 consists of a length of an elastic rubber extrusion having a substantially V-shaped wiping portion 12 for engagement with a windshield, which portion is connected through a narrow neck portion 14 with a bulbous head portion 16.

The backing strip 20 consists of a length, a little longer than blade 10, of an extrusion of a stiff resilient material, preferably of a thermoplastic resin such as a black polycarbonate resin impregnated with carbon black. It is formed with a central hollow, or cavity 22 extending longitudinally from end to end thereof, with a slot 23 along the bottom of the hollow, and with laterally open channels 24 and 26 bounded by upper and lower flanges 24a, 24b and 26a, 26b along its opposite sides. The hollow 22 and slot 23 receive slidably through either end of the strip the head and neck portions 14 and 16, respectively, of the elastic blade 10. The channels 24 and 26 are formed to receive slidably the ends of the claws of the blade holder. The backing strip 20 can be obtained simply by cutting a suitably formed extrusion of the strip material to the required length.

The fastening clip 30 is a unitary piece of a stiff resilient material, which is shaped to the form shown from a stamped-out strip of a suitable sheet metal. The metal may be phosphor bronze or a beryllium-copper alloy, but preferably it is a sheeted stainless steel, such as No. 302 stainless steel, about 0.012 to 0.016 inch thick.

The clip is formed with a base portion 31 to lie across an end of backing strip 20 and with wing portions 32 and 33 which are bent forwardly and slightly outwardly from the opposite ends of base portion 31 so as to overlie and, normally, slope away from end portions of the strip chennels 24 and 26. A footing portion formed as a tongue 34 having an upturned lip 35 extends forwardly from an upper region of the base portion 31 at a central location between the wing portions, so as to fit into an end portion of the central hollow 22 in the backing strip. Further, the wing portions have resilient legs 35 and 36 which extend inwardly from their upper edges and then forwardly so as to overlie the upper flanges 24a and 26a of the backing strip in face to face relation thereto, and these legs have at their ends outwardly protruding latch portions 37 and 38, respectively.

The latch portions 37 and 38 are spaced ahead of the wing portions 32 and 33 and are formed to extend outwardly beyond the backing strip channels so that, when the blade unit is in use, they will engage with an end set of the claws 8 of the blade holder to hold the blade unit latched securely yet detachably in place.

The outward slope of the wing portions 32 and 33 normally holds the legs 35 and 36 and their latch portions 37 and 38 in position to engage with an end set of the blade holder claws when clip 30 is in place on the backing strip end. The latch portions present lateral backward surfaces 37a and 38a, respectively, to retain a set of claws in spaces of the strip channels defined between these surfaces and the wing portions of the clip. They also present, over and laterally outside the channels, forward surfaces 37b and 38b which are sloped backwardly in the outward direction, for wedging engagement with an end set of the claws so that the legs and latch portions will be converged elastically inward to admit these claws easily into said channel spaces.

The resilience of the clip 30 and the location and outward slope of its wing portions 32 and 33 enable these portions to be engaged easily between a person's fingers and to be converged elastically by finger pressure, against the resistance of the stiff clip material, so as to displace the latch portions 37 and 38 inwardly of the backing strip edges and thus release the clip and the blade unit from engaged claws of the blade holder.

The structures of the clip 30 enable it to be fitted onto an end of the backing strip 20 by a simple linear movement relative to the strip end, as indicated in FIG. 3. The footing portion, or tongue, 34 enters into the end of the strip hollow 22, while the legs 37 and 38 pass over the upper surface of the strip to their working position. Then the clip so placed is affixed to the backing strip by a struck-down portion, or tab, 39 of the strip material, which is lanced and pushed down from the top wall of the hollow 22 so as to lie in abutting relation to the upstanding lip 35 of the footing portion inside the hollow.

In that assembled condition, the clip is fixed securely on the strip end with its footing portion 34 closing an end of the hollow 22 so that the elastic blade slid into the strip cannot move beyond the clip. The clip cannot then be removed from the strip, unless by forceable severance of the tab 39 to release the clip.

The clip 30 in place on the backing strip serves effectively for fastening the blade unit detachably on the claws of the blade holder or any of various forms commonly used in automobile windshield wipers. As the blade unit is slid onto such claws, the claws of the set first engaged with it butt against the sloped forward surfaces 37b and 38b of the latch portions 37 and 38 and then, with little force needed, deflect those portions inwardly by a camming action so as to pass over them into the spaces 29a, 29b between them and the wing portions 32, 33. The blade unit thus is latched securely to an end set of claws for all conditions of handling and use of the wiper. When the blade unit is to be replaced, however, it can easily be released for sliding off the claws by the pressure of a person's fingers applied to the wing portions 32, 22, which converges the legs 35 and 36 sufficiently to free their latch portions from the engaged claws.

FIG. 5 of the drawings shows an alternative embodiment of the invention, in which the fastening clip 30A is formed like the clip 30 of FIGS. 2–4 excepting that its footing portion 40A is formed to extend over and be fixed to the upper surface of the backing strip 20 in the region behind and between backward portions of the clip legs 35 and 36. The footing portion 40A is formed as a tongue notched at 41 in its opposite side edges and bent forwardly over the backing strip from the top of the base portion 31A of the clip. It is fixed to the strip by a wire staple 42 the legs of which are driven through strip 20 at either side of the hollow 20 so as to engage into the notches 41. This manner of fixing the clip in place, though less desirable in some respects than that of the embodiment of FIGS. 2–4, has an advantage in that it permits the rubber wiping blade 10 to extend entirely to the end of the backing strip 20, up to the point where the blade end will butt against the clip base portion 31A lying across the strip end.

I claim:

1. In a windshield wiper blade unit including an elongate backing strip of resilient material formed longitudinally with a cavity slotted along the bottom thereof for receiving slidably head and neck portions of an elastic wiper blade and having along the opposite sides thereof upper and lower lateral flanges bounding laterally open channels for slidably receiving the claws of a pressure-applying wiper blade holder, and a resilient clip secured to one end of said strip for holding said unit assembled detachably on said claws, the improvement wherein said cavity, said slot and said channels extend completely to said strip end and said clip is a unitary shaped piece of a stiff resilient material forming a base portion lying across said strip end, a footing portion extending from an upper central region of said base portion and mating to a central end portion of said strip, means fixing said footing portion to said central end portion so as to prevent removal of said clip from said strip, and resilient wing portions extending from the opposite ends of said base portion over but normally diverging away from end portions of said channels, at least one of said wing portions having a substantially flat leg extending therefrom laterally and then in the direction away from said base portion over one of said upper flanges in face to face relation thereto, each said at least one leg having thereon near its end a latch portion normally protruding laterally outside the underlying flange for engagement with one of said claws, said wing portions being convergeable elastically by pressure of a person's fingers to release each said latch portion from such engagement.

2. A wiper blade unit according to claim 1, said footing portion extending from said base portion into said cavity and having on its end inside said cavity an angled lip held in place by a tab struck from said strip into butting engagement with said lip in said cavity.

3. A wiper blade unit according to claim 1, said clip being a piece of corrosion-resistant sheet metal shaped to form said base portion, said footing portion and said wing portions with a leg aforesaid extending from each of said wing portions.

4. In a windshield wiper blade unit including an elongate backing strip of resilient material formed longitudinally with a cavity slotted along the bottom thereof for receiving slidably head and neck portions of an elastic wiper blade and having along the opposite sides thereof upper and lower lateral flanges bounding laterally open channels for slidably receiving the claws of a pressure-applying wiper blade holder, and a resilient clip secured to one end of said strip for holding said unit assembled detachably on said claws, the improvement wherein said cavity, said slot and said channels extend completely to said strip end and said clip is a unitary shaped piece of resilient sheet metal forming a base portion lying across said strip end, a footing portion extending from an upper central region of said base portion and mating to a central end portion of said strip, and resilient wing portions extending from the opposite ends of said base portion over but normally diverging away from end portions of said channels, said wing portions each having a substantially flat leg extending laterally from an upper edge portion thereof and then in the direction away from said base portion over one of said upper flanges in face to face relation thereto, each said leg having thereon near its end a latch portion normally protruding laterally outside the underlying flange for engagement with one of said claws, said wing portions being convergeable elastically by pressure of a person's fingers to release each said latch portion from such engagement, said footing portion extending from said base portion into said cavity and having on its end inside said cavity an angled lip held in place by a tab struck from said strip into butting engagement with said lip in said cavity.

5. A resilient clip to hold assembled detachably on the claws of a pressure-applying wiper blade holder a windshield wiper blade unit including a backing strip of resilient elastomeric material forming a longitudinal cavity slotted along the bottom thereof and having along the opposite sides thereof upper and lower flanges bounding laterally open channels for slidably receiving said claws, said clip being a unitary shaped piece of a resilient corrosion-resistant sheet metal forming a base portion to lie across an end of said backing strip, a footing portion extending substantially perpendicularly from an upper central region of said base portion to mate to a central end portion of said strip, and resilient wing portions extending from the opposite ends of said base portion to overlie but normally diverge away from end portions of said channels, said wing portions each having a substantially flat leg extending laterally from an upper edge portion thereof toward the other wing portion and then further in the direction away from said base portion so as to lie over one of said upper flanges in face-to-face relation thereto, each said leg having thereon near its end a latch portion normally protruding laterally away from the leg so as to extend outside the underlying flange for engagement with one of said claws, said wing portions being convergeable elastically by pressure of a person's fingers to disengage said latch portions from engaged claws; said footing portion extending from a midportion of said base portion so as to be insertable into said cavity and having at its end an upturned lip adapted to be held in place by a tab struck down from said strip into butting engagement with said lip in said cavity.

* * * * *